(12) United States Patent
Panayides et al.

(10) Patent No.: US 12,025,242 B2
(45) Date of Patent: Jul. 2, 2024

(54) SLIDING SUBSEA FOUNDATIONS

(71) Applicant: Subsea 7 Limited, Sutton (GB)

(72) Inventors: Stylianos Panayides, Aboyne (GB); Toby Adam Powell, Kingswell (GB); Keith Duncan Lauder, Aberdeen (GB)

(73) Assignee: SUBSEA 7 LIMITED, Sutton (GB)

( * ) Notice: Subject to any disclaimer, the term of this patent is extended or adjusted under 35 U.S.C. 154(b) by 0 days.

(21) Appl. No.: 17/624,234

(22) PCT Filed: Jul. 3, 2020

(86) PCT No.: PCT/GB2020/051595
§ 371 (c)(1),
(2) Date: Dec. 30, 2021

(87) PCT Pub. No.: WO2021/001657
PCT Pub. Date: Jan. 7, 2021

(65) Prior Publication Data
US 2022/0373102 A1 Nov. 24, 2022

(30) Foreign Application Priority Data
Jul. 4, 2019 (GB) .................................... 1909644

(51) Int. Cl.
F16L 1/12 (2006.01)
E02D 27/52 (2006.01)
F16L 1/20 (2006.01)
E02B 17/00 (2006.01)

(52) U.S. Cl.
CPC .............. F16L 1/123 (2013.01); E02D 27/52 (2013.01); F16L 1/20 (2013.01); E02B 2017/0043 (2013.01)

(58) Field of Classification Search
CPC .. E02D 27/52; E02B 2017/0043; F16L 1/123; F16L 1/20
See application file for complete search history.

(56) References Cited

U.S. PATENT DOCUMENTS 5,944,449 A * 8/1999 Angel ............... F16L 1/123
405/172
6,416,253 B1 * 7/2002 Wimp ............... F16L 1/123
405/35
9,909,689 B2 3/2018 Du
(Continued)

FOREIGN PATENT DOCUMENTS

CN 205822279 12/2016
DE 102009030695 A1 * 2/2010 .............. E04F 15/02
(Continued)

Primary Examiner — Frederick L Lagman
Assistant Examiner — Stacy N Lawson
(74) Attorney, Agent, or Firm — MATTINGLY & MALUR, PC

(57) ABSTRACT

A sliding subsea foundation comprises a polymeric shoe layer on the underside of a mudmat or subsea structure. The shoe layer defines a soil-engaging face that comprises an array of parallel grooves. The grooves are shallower than the thickness of the shoe layer such that each groove has a closed top, defined by and integral with the shoe layer, that spans the groove. Where a subsea structure is supported on the foundation with a subsea pipeline attached to the structure, the grooves are substantially parallel to a longitudinal axis of the pipeline.

22 Claims, 2 Drawing Sheets

(56) References Cited

U.S. PATENT DOCUMENTS

| | | | |
|---|---|---|---|
| 10,544,880 B2 | 1/2020 | Du | |
| 2013/0070565 A1 | 3/2013 | Eisenhower et al. | |
| 2013/0101359 A1* | 4/2013 | Maier | E02D 27/52 |
| | | | 405/224 |
| 2016/0025240 A1* | 1/2016 | Du | F16L 1/20 |
| | | | 405/184.4 |
| 2017/0350536 A1 | 12/2017 | Routeau | |

FOREIGN PATENT DOCUMENTS

| | | | |
|---|---|---|---|
| EP | 2 042 794 | 4/2009 | |
| EP | 2 881 519 | 6/2015 | |
| GB | 2461531 A * | 1/2010 | ............ E04F 15/02 |
| GB | 2511500 | 9/2014 | |
| JP | H9195248 | 7/1997 | |
| WO | WO 2008/155747 | 12/2008 | |
| WO | WO 2018/111120 | 6/2018 | |

* cited by examiner

SLIDING SUBSEA FOUNDATIONS

BACKGROUND OF THE INVENTION

This invention relates to sliding foundations for heavy subsea structures placed on seabed soils, in particular as may be required in the offshore oil and gas industry. Examples of such structures include towheads of subsea pipeline bundles and accessories incorporated in subsea pipelines.

A pipeline bundle comprising two or more parallel rigid pipelines can be fabricated and tested onshore as part of a towable unit. The unit further comprises an enlarged structure, known in the art as a towhead, disposed at one or both ends of the bundle. The or each towhead has valves, connectors and manifolds to facilitate subsea coupling of spool or jumper pipes that integrate the bundle into a production installation when the bundle has been lowered to the seabed. The or each towhead may also include equipment for subsea processing of production fluids, or to perform other subsea functions.

Once fabricated and tested, the bundle and towhead(s) are launched together into the sea to be towed as a unit to an offshore installation site, where they are then landed on the seabed at the required location.

Other marine pipelaying techniques, generally categorised as S-lay or J-lay, involve fabrication of a rigid subsea pipeline aboard a surface vessel. Rigid pipelines may also be installed in reel-lay operations, where the pipeline is pre-fabricated and spooled onto a reel to be unspooled and straightened before being launched from a vessel into the sea.

In S-lay, J-lay and reel-lay operations, subsea pipelines are routinely fitted with accessories during installation to provide operational flexibility, to create desired field layouts and to support future field extensions. Such accessories may be disposed at the ends of a pipeline and at positions along its length. They include in-line tee assemblies (ILTs or ITAs), pipeline end manifolds (PLEMs), pipeline end terminations (PLETs, sometimes called flowline end terminations or FLETs), tie-in branches, valves, connectors, wyes, tees, shutdown valves, pigging connections, pig-launching and pig-receiving equipment and other subsea structures.

By way of example, an ILT typically weighs several tons. Larger accessories such as PLETs may weigh tens of tons, whereas towheads of pipeline bundles may weigh hundreds of tons.

Once landed on a soft seabed of sand or silt, the weight of such a heavy structure must not be borne by a pipe that is attached to the structure. The structure must instead be supported by a foundation that provides an interface with the seabed. In addition to supporting the weight of the structure and resisting external loads, the foundation has to cope with the elevated centre of gravity of the structure that it supports and the torque that may be applied by jumper or spool pipes attached to the structure. The foundation must keep the structure and the attached pipe stable by resisting rotation and excessive lateral movement and must also avoid excessive settlement or embedment into the seabed soil.

Another challenge of subsea foundation design is that a pipeline or pipeline bundle will undergo cycles of thermal elongation and contraction during production of hot fluid due to temperature fluctuations between operation and shutdown. Consequently, structures connected to a pipeline or bundle are susceptible to move parallel to the seabed. Allowing such a structure to move horizontally relative to the seabed provides a degree of freedom to the pipeline, which is therefore less prone to buckling under compressive stress arising from thermal expansion or other displacement.

Conventional subsea foundations are of two main types, namely pile foundations and mat foundations.

Piles are generally cylindrical and are elongated vertically to be buried deeply in the seabed soil, in an upright orientation. Piles are intrinsically designed to resist any horizontal movement across the seabed, although they may be surmounted by a docking system that allows for some horizontal movement of the structure being supported.

Mat foundations, typically known in the art as mudmats, are generally flat and are designed to lie on the seabed in a substantially horizontal plane to spread the weight loads that they carry in use. The principle of a mudmat is to provide a bearing area that is sufficient to avoid or to minimise embedment of the foundation into the seabed. In principle, therefore, mudmats should be as long and wide as possible to define a large base area. However, there are limits on mudmat size imposed by considerations of cost, weight and ease of installation. One such constraint is the capability of a vessel that installs mudmats with their related accessories as part of a subsea pipeline. In that case, the pipelaying equipment on the vessel has to allow enough space for the mudmats to pass through as the pipeline is launched into the sea.

A mudmat typically comprises a horizontal top plate, which is usually rectangular. An example is shown in WO 2008/155747. Mudmats may also be paired, one each side of the pipeline, and are typically about 5 m to 10 m in width and about 5 m to 20 m in length. A mudmat may even be mounted on a pile, as shown in WO 2018/111120, which provides additional bearing capacity.

Mudmats can be designed to slide horizontally across the seabed to accommodate thermal expansion and contraction that causes a pipeline to lengthen and shorten. Alternatively, mudmats can be designed to remain substantially static on the seabed but with provision for the supported structure to move to a limited extent with respect to the mudmat. For example a vertical peripheral skirt around the top plate may embed into and engage with the seabed soil. The soil may also be engaged by vertical wall-like members that extend across the underside of the top plate.

As an alternative to solid-surface mudmats, perforated foundations are penetrated from top to bottom by multiple voids or through-openings distributed within the plan area of the foundation. An example of a perforated foundation is a grillage that comprises an array of mutually-spaced structurally-connected strip footings or plates of steel arranged in parallel and/or intersecting vertical planes as a grid or grating to penetrate and engage the seabed soil. The plates are thin compared with their height, typically more than five times higher or longer in the vertical direction than their horizontal thickness. The centre-to-centre horizontal spacing between adjacent plates is also substantially greater than their thickness, again typically by a factor of at least five.

The open-topped gaps between the plates of a grillage allow water to flow between them and hence through the foundation. This improves hydrodynamic performance as the foundation is being lowered through the splash zone and the water column during installation. Yet, with sufficient penetration, grillages can achieve a vertical load-bearing capacity that is similar to solid, substantially unperforated foundations of the same plan area. Also, grillages may offer savings in material and weight, albeit with potentially greater cost of fabrication. However, a grillage is not designed to slide across the seabed.

A subsea foundation may also be created or reinforced by depositing a thick berm of rock ballast onto the seabed. However, this is challenging and expensive, particularly as an additional foundation element such as a mudmat may still be required. Also, the plan area of the berm has to be much greater than the plan area of the mudmat.

As a mudmat is of rough or painted steel, its ability to slide will be jeopardised by frictional wear with the sand or silt of the seabed and so will tend to deteriorate with time. A polymeric sole plate on the underside of a solid-surface mudmat is therefore sometimes used as a low-friction interface between the mudmat and the seabed. Of course, the use of a sole plate on a grillage would not be practical and would undermine the hydrodynamic benefits of such a foundation.

Merely reducing friction between a sliding mudmat and the seabed is not necessarily desirable because it reduces control over the position of the mudmat. In this respect, a foundation may be subjected to significant lateral loads in use, transverse to the length of an associated pipeline or bundle. For example, a pipeline may be curved in plan view, hence exerting a lateral force component in response to thermal expansion or contraction. Also, a structure supported by the foundation may be subjected to ocean currents or, in relatively shallow water, to the effects of storms. Over time, this leads to an effect known as 'walking' of the pipeline across the seabed from its original position.

Whilst it is desirable to allow limited freedom of longitudinal movement parallel to the length of an associated pipeline or bundle, it is also desirable to resist lateral loads so as to minimise unintended displacement of the pipeline or bundle. Unintended displacement can be especially problematic for structures such as accessories and towheads that are required to connect the pipeline or bundle to other subsea infrastructure.

DESCRIPTION OF RELATED ART

CN 205822279 describes a system that is designed to reduce the effect of scour around a marine structure. The system includes a flexible cover layer and a ballast layer which may take the form of a sandbag or a concrete block.

JP H09195248 describes a sheet that can be laid on the surface of the seabed during a drainage operation. The sheet is formed by overlapping edges of multiple sheet members, such that a projection on one sheet member is received in a recess of a neighbouring sheet member.

GB 2511500 describes mudmats having foundation elements that are movable from a stowed position to a deployed position through sliding or pivoting.

BRIEF SUMMARY OF THE INVENTION

Against this background, the present invention provides a sliding subsea foundation that comprises a polymeric shoe layer, for example of high density polyethylene (HDPE), wherein the shoe layer defines a soil-engaging face that comprises at least one elongate groove. The or each groove may have various cross-sectional shapes, for example part-elliptical or polygonal.

The foundation comprises an array of substantially parallel grooves, which grooves may be separated from neighbouring grooves by at least one land. Two or more of the lands may be integral with the shoe layer and with each other.

The or each land may, for example, have a width that is at least one third of the width of each groove, in a direction orthogonal to a length direction of the grooves. Also, each groove may have a depth, in a direction orthogonal to the soil-engaging face, of no more than twice the width of the or each land.

The or each groove is suitably shallower than a thickness dimension of the shoe layer in a direction orthogonal to the soil-engaging face. In that case, the or each groove may have a closed top that spans the groove. The closed top of a groove may conveniently be defined by the shoe layer or by a structural member of the foundation or structure to which the shoe layer is attached, such as a mudmat.

A subsea structure may be supported on the foundation, in which case a subsea pipeline may be attached to the subsea structure for fluid communication with the subsea structure. The or each groove is suitably aligned with a longitudinal axis of the pipeline where the pipeline is attached to the subsea structure.

When the foundation is in situ on seabed soil, the friction angle at an interface between the foundation and the seabed soil may advantageously be lower in a longitudinal direction parallel to the length of the or each groove than in a transverse direction orthogonal to the length of the or each groove. For example, in the transverse direction, the interface friction angle may be substantially equal to the effective internal friction angle of the seabed soil. Conversely, in the longitudinal direction, the interface friction angle may be between 3° and 7° less than the effective internal friction angle of the seabed soil.

The inventive concept embraces a corresponding method of supporting a subsea structure on the seabed. The method comprises: supporting the structure on a sliding subsea foundation that comprises a polymeric shoe layer; and engaging soil of the seabed with a soil-engaging face of the shoe layer, which face comprises at least one elongate groove.

The method of the invention may further comprise: promoting sliding of the foundation across the seabed in a direction parallel to the or each groove; and resisting sliding of the foundation across the seabed in a direction orthogonal to the or each groove. For example, the foundation may slide parallel to the or each groove in response to thermal expansion or contraction of a pipeline that is attached to the structure and that extends substantially parallel to the or each groove.

The method of the invention may also comprise the preliminary step of attaching the shoe layer to the foundation or to the structure as a shoe plate that comprises an array of two or more grooves.

The method of the invention may further comprise the preliminary steps of: lowering the foundation or the structure to the seabed with the or each groove of the shoe layer exposed on an underside of the foundation or the structure; and sandwiching the shoe layer between the seabed and the foundation or the structure. Soil of the seabed may then substantially fill the or each downwardly-opening groove up to a closed top of the groove.

The current design philosophy for towhead foundations is based on typical industry practice in the North Sea, which has been validated by experimental data. This aims for a friction angle δ at the interface between the foundation and the seabed soil of:

$$\delta = \varphi' - 5°$$

$\varphi'$ where is the effective internal friction angle of the seabed soil itself.

Testing of a smooth sole plate has established that HDPE is hardwearing enough to be used as a sacrificial interface layer in a permanent foundation design.

Further testing has established the full load displacement response for mudmats fitted with smooth and pre-grooved sole plates of HDPE and has assessed friction values at the soil/HDPE interface, under both longitudinal and lateral loads applied parallel to the seabed.

By pulling in a lateral direction transverse or orthogonal to the length of the grooves, tests have established that the mudmats fitted with pre-grooved HDPE displayed an increase of the interface friction angle to around $\delta=\varphi'$.

In a longitudinal direction parallel to the length of the grooves, the interface friction angle is maintained at around $\delta=\varphi'-5°$ to facilitate expansion of an associated pipeline or bundle.

The effectiveness of the foundation translates into cost savings in ballasting material and also valuable reductions in installation vessel time and in the pumping spread required on board the vessel.

In summary, the invention improves the contact or interface between the seabed and a polymeric sole plate on the underside of a mudmat, towhead or other structure to optimise friction, even if the sole plate is damaged or worn.

Embodiments of the invention provide an interface between a foundation mat and the seabed, the interface comprising a solid polymer layer, for example of HDPE, having at least one groove in contact with the seabed.

The foundation mat may support a structure in fluid communication with a pipeline, such as a towhead or a pipeline accessory. In that case, the or each groove may suitably extend in the axial direction of the pipeline.

In cross-section, the groove may have a substantially triangular or part-cylindrical shape, such as a half-cylindrical shape.

Where there are two or more grooves, a rim or ridge between two adjacent grooves may have a width that is at least equal to one third of the width of a groove.

Embodiments of the invention also implement a method for installing a foundation for supporting oil and gas production equipment on the seabed. That method comprises the following steps: assembling the structure onshore; attaching a polymeric shoe layer under the structure, onshore or offshore, wherein the polymeric shoe layer defines a soil-engaging face that comprises at least one elongate groove; and installing the structure with the polymeric shoe layer under water onto the seabed, so that the shoe layer engages soil.

In preferred embodiments, the invention resides in a sliding subsea foundation that comprises a polymeric shoe layer on the underside of a mudmat or subsea structure. The shoe layer defines a soil-engaging face that comprises an array of parallel grooves. The grooves are shallower than the thickness of the shoe layer such that each groove has a closed top, defined by and integral with the shoe layer, that spans the groove. Where a subsea structure is supported on the foundation with a subsea pipeline attached to the structure, the grooves are substantially parallel with a longitudinal axis of the pipeline.

BRIEF DESCRIPTION OF THE DRAWINGS

In order that the invention may be more readily understood, reference will now be made, by way of example, to the accompanying drawings in which.

DETAILED DESCRIPTION OF THE INVENTION

Figure 1:
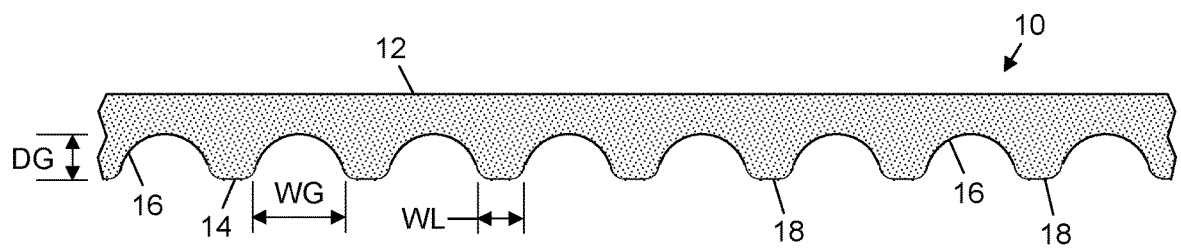
FIG. 1 is a schematic partial end view of a polymeric shoe plate for a mudmat in accordance with the invention.
Figure 2:
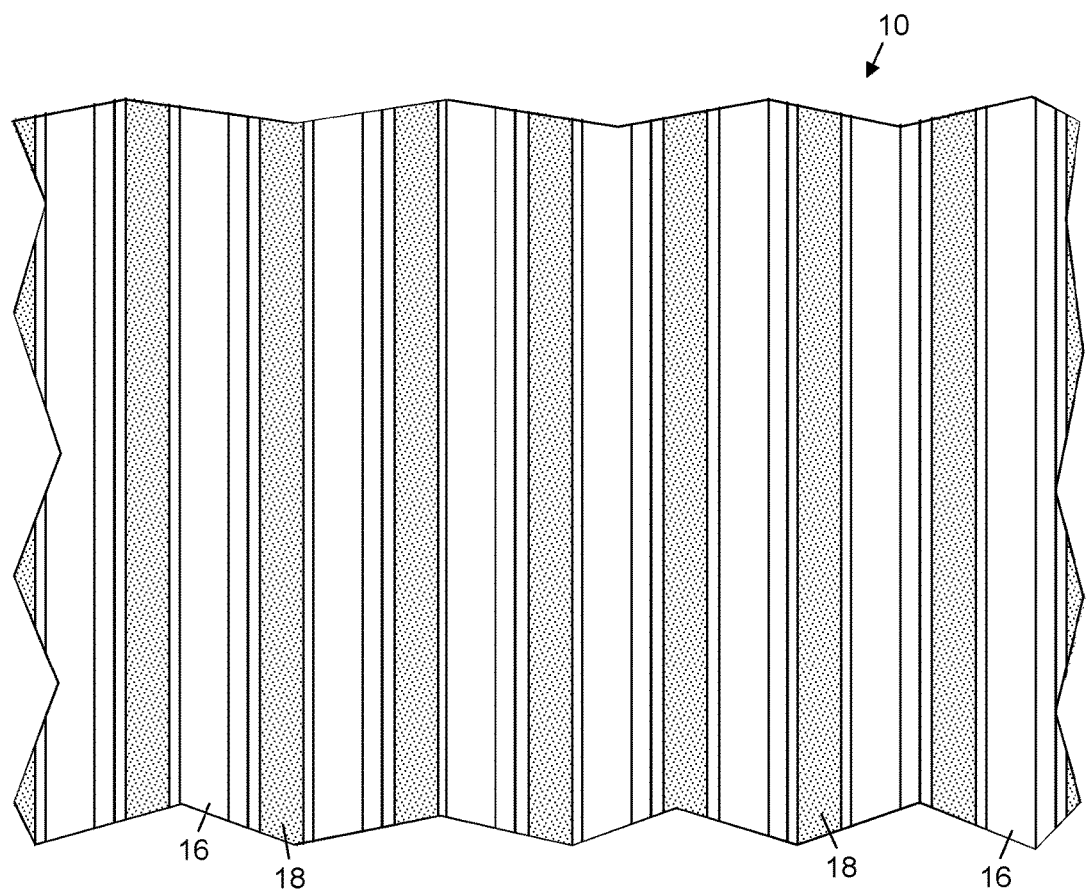
FIG. 2 is a partial bottom plan view of the shoe plate shown in FIG. 1.

Referring firstly to FIGS. 1 and 2 of the drawings, a shoe plate 10 is moulded as a homogenous solid unitary body from a polymer material such as HDPE. The cross-sectional shape of the shoe plate 10 may be imparted by the moulding process or after moulding, for example by milling or otherwise machining a surface of a moulded panel or block.

The shoe plate 10 comprises an upper face 12 and a lower face 14 that extend in substantially parallel planes and are spaced apart by the overall thickness of the shoe plate 10, measured on an axis orthogonal to those planes.

The soil-engaging lower face 14 of the shoe plate 10 has a grooved texture that comprises an array of straight grooves 16, being trough-like elongate recesses. The grooves 16 extend part-way through the thickness of the shoe plate 10. Thus, the top of each groove 16 is closed by the remaining, unperforated thickness of the shoe plate 10.

In this example, the grooves 16 are substantially parallel. Thus, the array is substantially unidirectional. Also, the grooves 16 are substantially equi-spaced in this example. Thus, the grooves 16 of the array are distributed substantially uniformly across the width of the shoe plate 10.

In the preferred embodiments shown, the grooves 16 are open-ended and are uniform in cross-section, continuous and uninterrupted along their full length.

Adjacent grooves 16 of the array are bounded and spaced apart by elongate ridges or lands 18 that alternate with the grooves 16 across the width of the shoe plate 10. Collectively, the lands 18 are aligned with each other in a common plane that defines the plane of the lower face 14. Thus, collectively, the lands 18 are substantially co-planar. Individually, the lands 18 are each substantially planar, save for radiused edges at the interfaces between the lands 18 and the grooves 16 that adjoin them.

At the mid-point level of the radiused transitions between the grooves 16 and the lands 18, each land 18 has a width WL between an adjacent pair of grooves 16 of at least one third of the width WG of each groove 16. In other words, the grooves 16 are mutually spaced apart by at least one third of their width WG in a direction orthogonal to their length, parallel to the plane of the lower face 14 of the shoe plate 10.

Each groove 16 has a depth DG in an upward direction orthogonal to the lower face 14. The depth DG of each groove 16 is substantially equal to the width WL of each land 18 in this example. DG may be more or less than WL but is preferably no more than twice WL.

In FIGS. 1 and 2, each groove 16 is part-cylindrical and has a part-circular cross-section, in this example substantially semi-circular. Other curved or part-elliptical cross-sectional shapes are possible.

Figure 3:
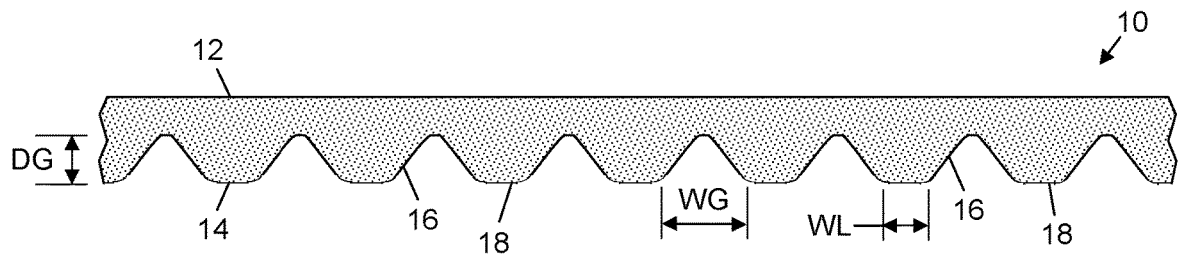
FIG. 3 is a schematic partial end view of a variant of the shoe plate shown in FIGS. 1 and 2.

FIG. 3 shows a variant of the shoe plate 10 in which like numerals are used for like features. Here, each groove 16 has a substantially triangular cross-section whose general shape is akin to an isosceles or equilateral triangle. However, the apex of the triangular cross-section defining the base of the groove 16 is suitably radiused as shown. Other polygonal cross-sectional shapes are possible.

Figure 4:
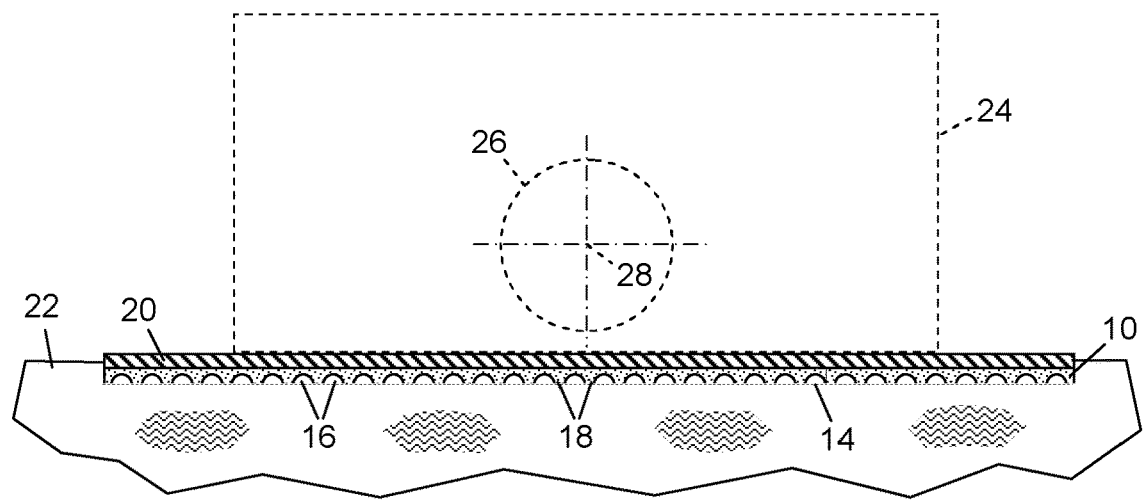
FIG. 4 is a schematic part-sectional end view of a mudmat fitted with the shoe plate of FIGS. 1 and 2, forming a seabed foundation for a subsea structure exemplified here by an accessory at an end of a pipeline.
Figure 5:
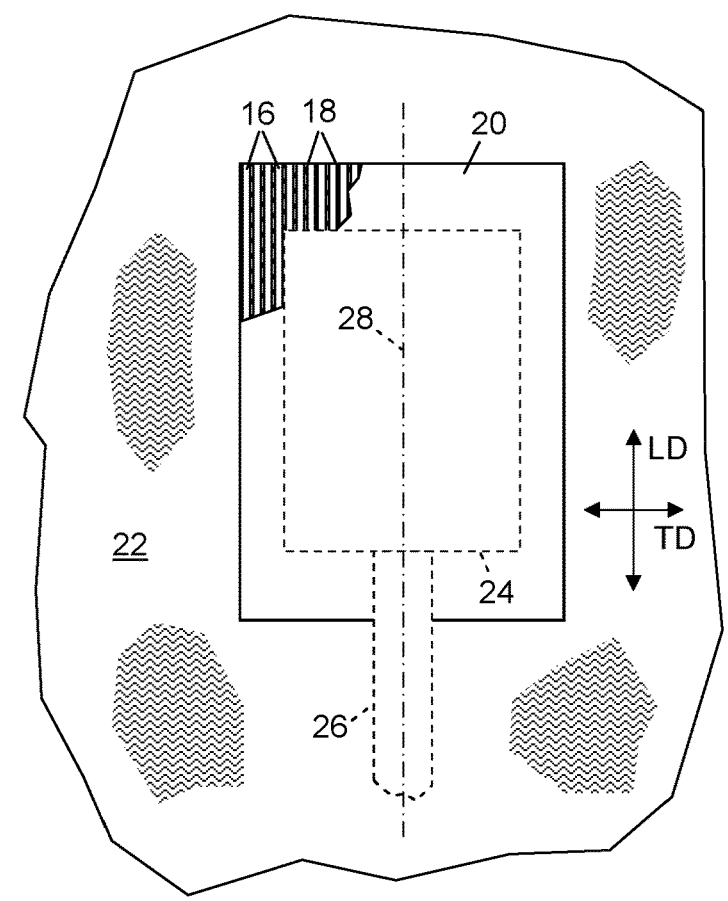
FIG. 5 is a schematic plan view of the mudmat, accessory and pipeline shown in FIG. 4, partially cut away to show the shoe plate sandwiched between the mudmat and the seabed.

The shape of the planar upper face 12 of the shoe plate 10 is chosen to form an interface that complements the shape of the underside of a mudmat 20 to which the shoe plate 10 is to be attached as shown in FIGS. 4 and 5. Thus, the upper face 12 is not necessarily textured and is suitably plain.

FIGS. 4 and 5 show the shoe plate 10 of FIGS. 1 and 2 mounted to the flat underside of a sliding mudmat 20. The mudmat 20 is typically of steel. The shoe plate extends continuously across the underside of the mudmat 20 and may be bonded or otherwise attached to the mudmat 20 onshore or offshore.

The mudmat 20 is shown here installed on the seabed 22. Thus, the shoe plate 10 is sandwiched between the mudmat 20 and the seabed 22 with its grooved lower face 14 engaged with the sandy or silty soil of the seabed 22.

The mudmat 20 is shown supporting a subsea structure 24 in the form of a pipeline accessory such as a PLET. A subsea pipeline 26 is shown joined to the structure 24 for fluid communication between them. The pipeline 26 will tend to extend and contract along its central longitudinal axis 28 in response to changes in the temperature of the fluid within the pipeline 26. Thus, it is desirable that the mudmat 20 can slide across the seabed 22 in directions parallel to the central longitudinal axis 28 of the pipeline 26.

For this reason, the grooves 16 formed in the lower face 14 of the shoe plate 10 extend substantially parallel to the central longitudinal axis 28 of the pipeline 26. In that longitudinal direction LD parallel to the length of the grooves 16, the interface friction angle is maintained at around $\varphi'-5°$ to allow limited freedom of longitudinal movement that facilitates thermal expansion of the pipeline 26. Conversely, in a transverse direction TD orthogonal to the length of the grooves 16, there is an increase of the interface friction angle to around $\varphi'$. Beneficially, this resists unintended displacement of the mudmat 20 under lateral loads in use, transverse to the central longitudinal axis 28 of the pipeline 26, which could otherwise result in the structure 24 and the pipeline 26 'walking' across the seabed 22.

Some variations have been described above; other variations are possible within the inventive concept. For example, the polymer material of the shoe plate may be reinforced by strands or fibres.

The grooves in the lower surface of the shoe plate have radiused edges and bases in the examples shown but they could have sharp edges and bases. The lands between the grooves need not be planar but could comprise sharp or radiused edges, peaks or ridges.

The shoe plate preferably extends across a majority of the plan area of the mudmat but need not extend across all of the plan area of the mudmat. The shoe plate could be discontinuous or more than one shoe plate could be attached to the mudmat. It would also be possible to attach a shoe plate directly to a subsea structure without an intervening mudmat.

In principle, it would be possible to assemble a shoe plate or shoe layer from an array of mutually-spaced parallel polymer strips that are affixed to the underside of a mudmat or directly to a subsea structure. Such strips would define the grooves in the spaces between them and would each define a respective land between adjacent grooves. In this case, the grooves could extend as slots through the full thickness of the shoe plate or shoe layer.

The invention claimed is:

1. A sliding subsea foundation comprises a mudmat and a polymeric shoe layer attached to the mudmat, wherein the shoe layer defines a soil engaging face that comprises an array of substantially parallel elongate grooves that extend continuously across a full length of the shoe layer, and that promote sliding of the foundation across the seabed in a direction parallel to the grooves and resist sliding of the foundation across the seabed in a direction orthogonal to the grooves when the foundation is in situ on seabed soil.

2. The foundation of claim 1, wherein the grooves of the array are separated by at least one land.

3. The foundation of claim 2, wherein two or more of the lands are integral with the shoe layer and with each other.

4. The foundation of claim 2, wherein the or each land has a width that is at least one third of the width of each groove, in a direction orthogonal to a length direction of the grooves.

5. The foundation of claim 2, wherein each groove has a depth, in a direction orthogonal to the soil engaging face, of no more than twice the width of the or each land.

6. The foundation of claim 1, wherein the or each groove is shallower than a thickness dimension of the shoe layer in a direction orthogonal to the soil engaging face.

7. The foundation of claim 6, wherein the or each groove has a closed top that spans the groove.

8. The foundation of claim 7, wherein the closed top is defined by the shoe layer.

9. The foundation of claim 7, wherein the closed top is defined by the mudmat of the foundation.

10. The foundation of claim 1, wherein the or each groove is of part elliptical cross section.

11. The foundation of claim 1, wherein the or each groove is of polygonal cross section.

12. The foundation of claim 1, further comprising a subsea structure supported on the foundation.

13. The foundation of claim 12, further comprising a subsea pipeline attached to, and in fluid communication with, the subsea structure.

14. The foundation of claim 13, wherein the or each groove is aligned with a longitudinal axis of the pipeline where the pipeline is attached to the subsea structure.

15. The foundation of claim 1, wherein the shoe layer is of high density polyethylene.

16. The foundation of claim 1, wherein when in situ on seabed soil, a friction angle at an interface between the foundation and the seabed soil is lower in a longitudinal direction parallel to the length of the or each groove than in a transverse direction orthogonal to the length of the or each groove.

17. The foundation of claim 16, wherein in the transverse direction, the interface friction angle is substantially equal to the effective internal friction angle of the seabed soil.

18. The foundation of claim 16, wherein in the longitudinal direction, the interface friction angle is between 3° and 7° less than the effective internal friction angle of the seabed soil.

19. A method of supporting a subsea structure on the seabed, the method comprising:
supporting the structure on a sliding subsea foundation that comprises a polymeric shoe layer;
engaging soil of the seabed with a soil engaging face of the shoe layer, which face comprises at least one elongate groove;
promoting sliding of the foundation across the seabed in a direction parallel to the or each groove; and
resisting sliding of the foundation across the seabed in a direction orthogonal to the or each groove.

20. The method of claim 19, comprising sliding the foundation parallel to the or each groove in response to thermal expansion or contraction of a pipeline that is attached to the structure and that extends parallel to the or each groove.

21. The method of claim 19, comprising the preliminary step of attaching the shoe layer to the foundation or to the structure as a shoe plate that comprises an array of two or more of the grooves.

22. The method of claim 19, comprising the preliminary steps of:
- lowering the foundation or the structure to the seabed with the or each groove of the shoe layer exposed on an underside of the foundation or the structure; and
- sandwiching the shoe layer between the seabed and the foundation or the structure.

\* \* \* \* \*